UNITED STATES PATENT OFFICE.

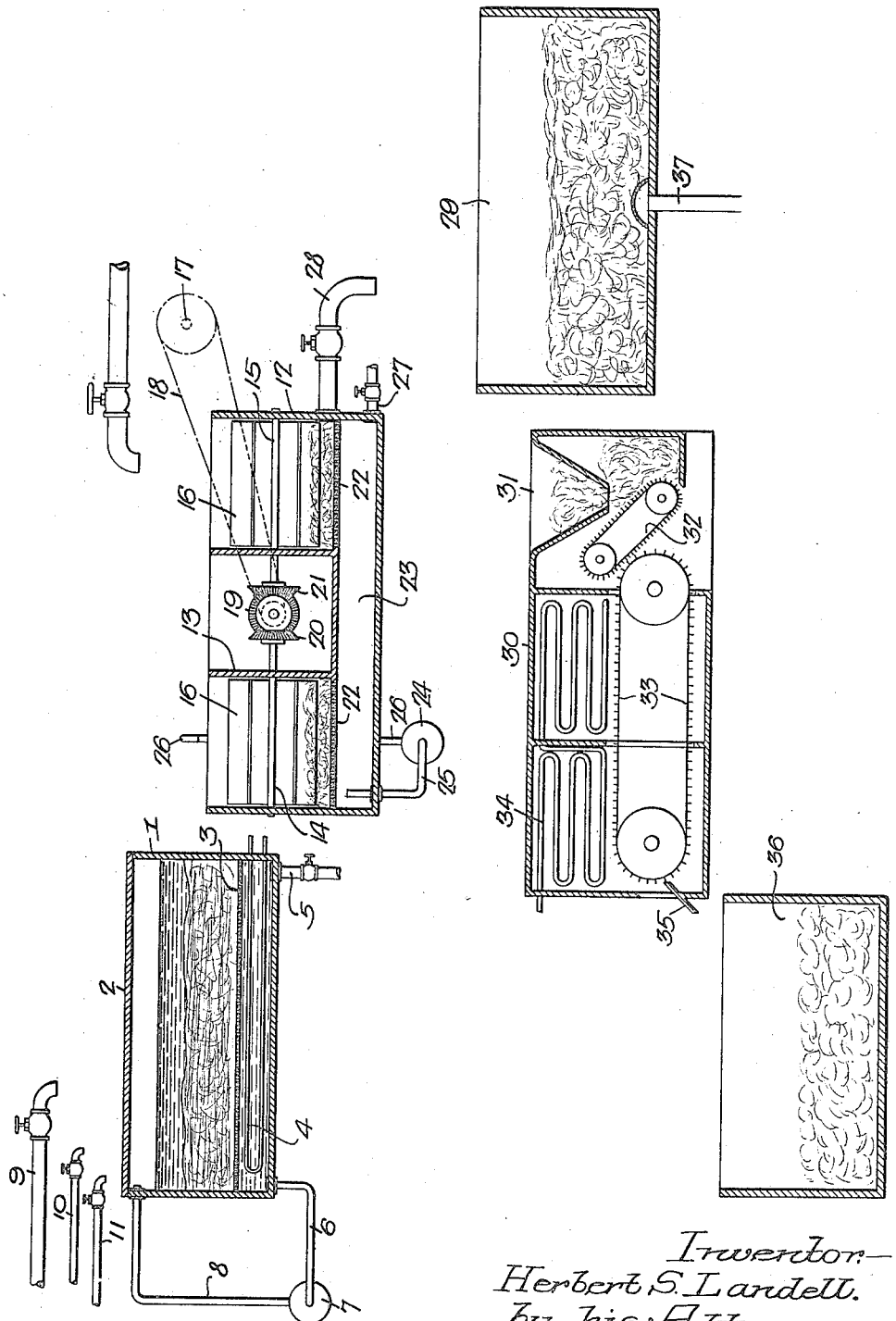

HERBERT S. LANDELL, OF PHILADELPHIA, PENNSYLVANIA, ASSIGNOR TO ANGLO-AMERICAN COTTON PRODUCTS CORPORATION, OF NEW YORK, N. Y., A CORPORATION OF NEW YORK.

METHOD OF TREATING COTTON-WASTE, &c.

1,222,422.     Specification of Letters Patent.    Patented Apr. 10, 1917.

Application filed September 14, 1915. Serial No. 50,688.

*To all whom it may concern:*

Be it known that I, HERBERT S. LANDELL, a citizen of the United States, residing in Philadelphia, Pennsylvania, have invented the Improved Method of Treating Cotton-Waste, &c., of which the following is a specification.

One object of this invention is to provide a novel succession of steps whereby raw material such as linters, raw cotton, waste, etc., may be prepared for nitrating, said method contemplating such a treatment as will free the material from dirt of all kinds, foreign bodies such as motes and shives, fats and oil, etc., so that when finished it shall be in the best possible condition for subsequent operations looking to the production of nitro-cellulose or other explosive compound.

These objects and other advantageous ends I secure as hereinafter set forth, reference being had to the accompanying drawings, in which, The figure is a diagrammatic representation of one combination of apparatus by which my method of treatment may be carried out.

In the above drawings 1 represents a tank or vat having a cover 2 and a partition 3 perforated to permit of the free passage of liquid while holding back the material under treatment. In the space between this partition 3 and the bottom of the tank is a heating coil 4. Said tank is provided with an outlet 5 for waste liquid and has connected to the space under the partition 3, a pipe 6 leading to the intake of a pump 7 whose outlet conduit 8 is connected to discharge into the upper part of the tank.

Pipes 9, 10 and 11 are so placed as to discharge into the tank when the cover 2 is removed and of these the first is connected to a source of water supply, the second to a container for caustic soda, and the third to a source of supply for sulfuric acid.

Preferably adjacent the tank 1 is mounted a beater 12 consisting of a vessel usually somewhat elliptical in plan, having centrally mounted within it a circular or elliptical partition 13 which thus forms an elongated annular container. Two shafts 14 and 15 are mounted in suitable bearings in line with each other within opposite parts of the annular container and on each of these shafts is mounted a series of paddles or beaters 16. Said shafts are driven from a shaft 17 connected through a belt 18, to a toothed gear 19 meshing with two beveled gears 20 and 21, respectively fixed to the shafts 14 and 15.

The lower part of the container 12 has a perforated horizontal partition 22 separating its main portion from the bottom portion 23 thereof and a pump 24 has its inlet 25 connected to draw liquid from this space and discharge it through a pipe 26 into the top of the container. An outlet or drain pipe 27 is connected to deliver the liquid from the space 23 to a drain and a main discharge pipe 28 is likewise connected to deliver both solid and liquid material from the container into a storage or receiving vat 29, it being obvious that both this outlet and that indicated at 27 as well as the outlet 5 are all supplied with the necessary controlling valves.

Preferably adjacent the tank 29 is a drier 30 having a hopper 31 for the reception of material, and having an elevating feed belt 32 placed to receive material from the hopper and provided with pins or pickers designed to carry up definite limited amounts of material. This endless belt 32 discharges onto a conveyer or apron 33 passing through one or more chambers, in the present instance two, heated by suitable means such as steam pipes 34, and said apron delivers the finished product to a chute 35 whereby it is guided into a receiving bin or container 36.

Under conditions of operation the linters, waste, etc., is delivered into the vat 1 where it is boiled for a more or less prolonged period, such for example as ten hours, with a 5% solution of caustic soda supplied from the pipe 10. The heat for such boiling is supplied by the steam pipe 4 and the liquid is maintained at such a depth as to always cover the material under treatment, being continuously circulated by the pump 7, which withdraws it from the space under the partition 3 and delivers it into the top of the vat. As a result of this treatment all fats, oils, and soluble organic matter are acted on by the caustic soda, which at the end of the period above noted is drawn off and replaced by washing water delivered from the pipe 9.

This water is circulated by the pump 7, being drawn off and replaced by fresh water from time to time until it remains clear. As a typical example, three hours' washing would be required and after the water has been finally removed the material is placed in the beater 12 with a solution of chlorid of lime (4° Twaddell) and said machine is operated for about 30 minutes, thus effectually bleaching said material.

The solution is then drained off and the beater is filled with water to which is added 1% or less of commercial sulfuric acid, the beater being then operated for about 10 minutes or until any traces of caustic soda or chlorid of lime as well as any acid-soluble substances are removed.

The acid solution is then drawn off and the material again washed for a period of one hour or until there is no trace of acid in the wash water. As a result of these treatments the material is torn up and finely divided, although it is not in sufficiently fine form to pass through the perforations of the false bottom 22 of the beater. While a constant horizontal circulation of water carrying the material is maintained within the annular container owing to the revolution in opposite directions of the paddles 16, there is also a general downward flow of the water in the tank due to the action of the pump 24 which draws said water from the space 23 and discharges it into the top thereof.

At the same time that this circulation of the pump is maintained, a certain proportion of the dirty water is discharged through the outlet 27, with the result that the tearing apart and violent agitation of the cotton completely frees it of the particles of foreign matter, which ultimately pass through the false bottom and are drawn off through the outlet 27. I find that it is preferable to subject the cotton to several distinct washings in the tank 12 rather than to one long continuous washing;—that is to say, after the beaters have been in operation for a period of fifteen minutes for example, all the water is drawn off and fresh water is supplied, the apparatus being again set in operation for another period of fifteen minutes, and so on until the cotton has been brought to the desired state of cleanliness. The cotton is thus more or less finely shredded while in the water in the beater 12 and by drawing off or decanting the water in the compartment 13 the solid foreign bodies which have been mechanically held or attached to the cotton are separated and removed.

At the completion of the last washing the cotton is in a shredded or finely divided, fluffy, and somewhat curled condition, being absolutely free of all particles of hulls, woody material, motes, dirt, etc., so that it is now delivered with the clean washing water through the outlet 28 into the receiving tank 29, though obviously it may be forked from the machine to said tank or pumped into the same without departing from my invention.

In the tank 29 the water is permitted to drain away through an outlet pipe 37, after which the still wet cotton is delivered to a hydro-extractor such as a centrifugal machine, (not shown) whereby the greater part of the remaining water is mechanically removed. From this extractor it is then delivered to the hopper 31 of the drier 30, passing to the elevating and distributing belt 32 and thence to the apron 33 which carries it through the heated drying chambers. From the last of these it falls into the receiving bin or holder 36 from which it is taken to a baling machine or directly to a nitrating tank.

The finished product of my method of treatment consists of white, fluffy, light, dry and somewhat curly shreds or masses free from oil and fat as well as from undesirable woody or other foreign bodies of all kinds.

In this shape it is in the best possible form for use in the manufacture of explosives, being particularly in the condition required for nitrating.

It is to be noted that my method of treatment is not limited merely to the treatment of the material known to the trade as "cotton waste" for if desired, I may utilize linters, raw cotton or any other cotton product which may require my treatment prior to nitration.

I claim;

1. A method which consists in treating cotton waste successively with an alkali and an acid; agitating the material in a body of water and permitting the foreign material to simultaneously settle out of said body of water; and finally drying the material.

2. The method which consists in circulating boiling caustic soda through a body of cotton waste; washing said material to remove the caustic soda; circulating acid through the material; washing said material to remove the acid; shredding the material; and finally drying it.

3. The method which consists in treating cotton waste successively with an alkali and an acid; agitating said material in the upper portion of a body of water and allowing the foreign material to settle in an unagitated portion of said water; drawing off said latter portion with the foreign bodies; removing the material from the water; and finally drying it.

4. The method which consists in treating cotton waste successively with an alkali and an acid; shredding said material in a body of water and allowing the foreign material to settle out of the same; removing said material from the water; mechanically removing the majority of the water held by the material; and finally exposing the material to heat to complete the drying.

HERBERT S. LANDELL.